Dec. 20, 1938.  H. COWAN  2,140,516
ELECTRICAL STEAM GENERATOR
Filed Oct. 15, 1936   3 Sheets-Sheet 1
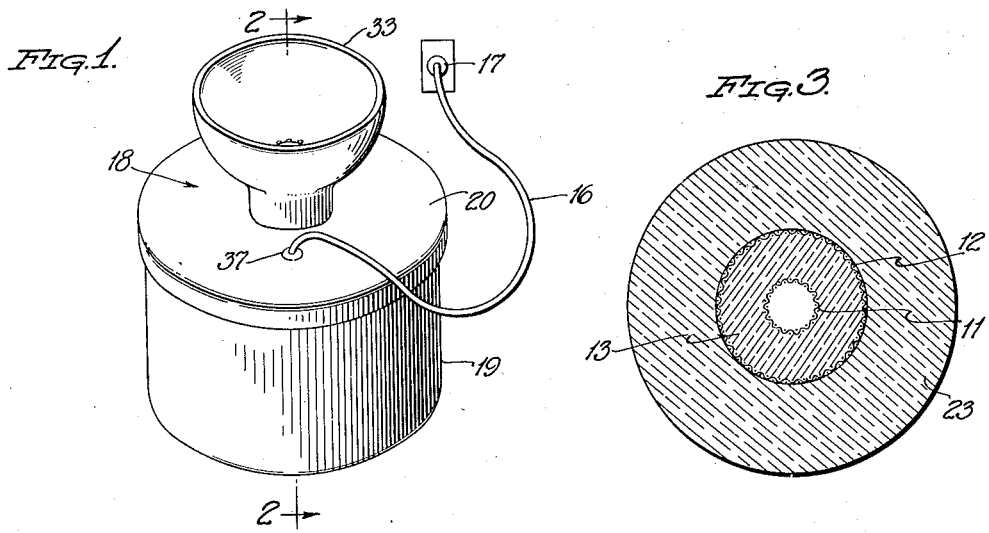
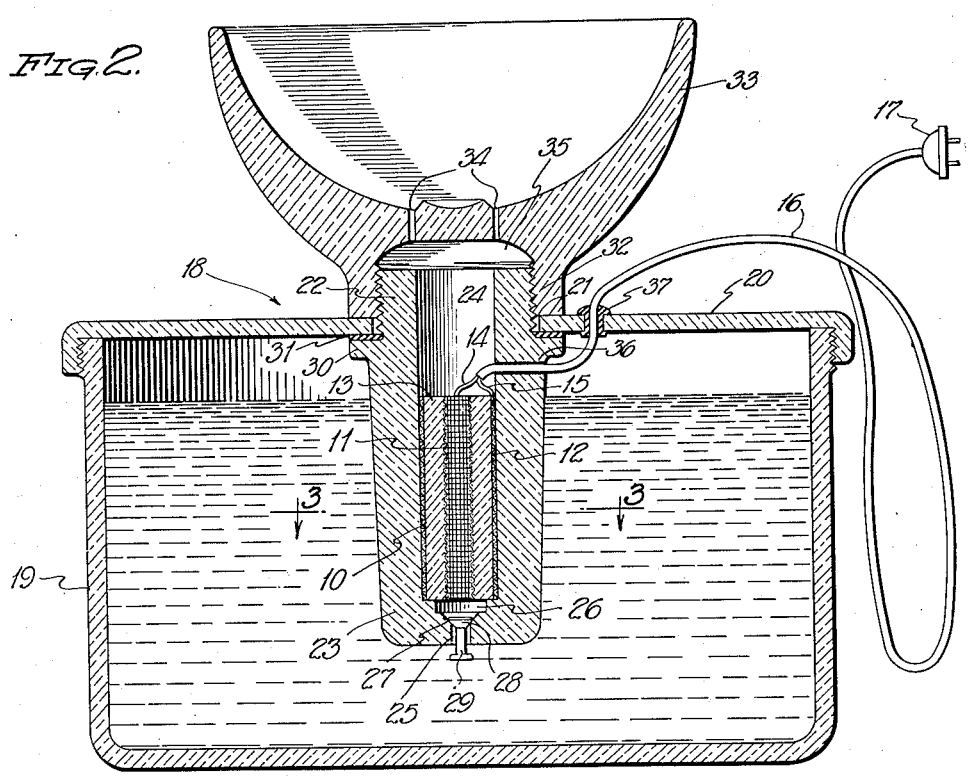
HARRY COWAN,
INVENTOR.
BY Ely & Pattison
ATTORNEYS.

Dec. 20, 1938.    H. COWAN    2,140,516
ELECTRICAL STEAM GENERATOR
Filed Oct. 15, 1936    3 Sheets—Sheet 2
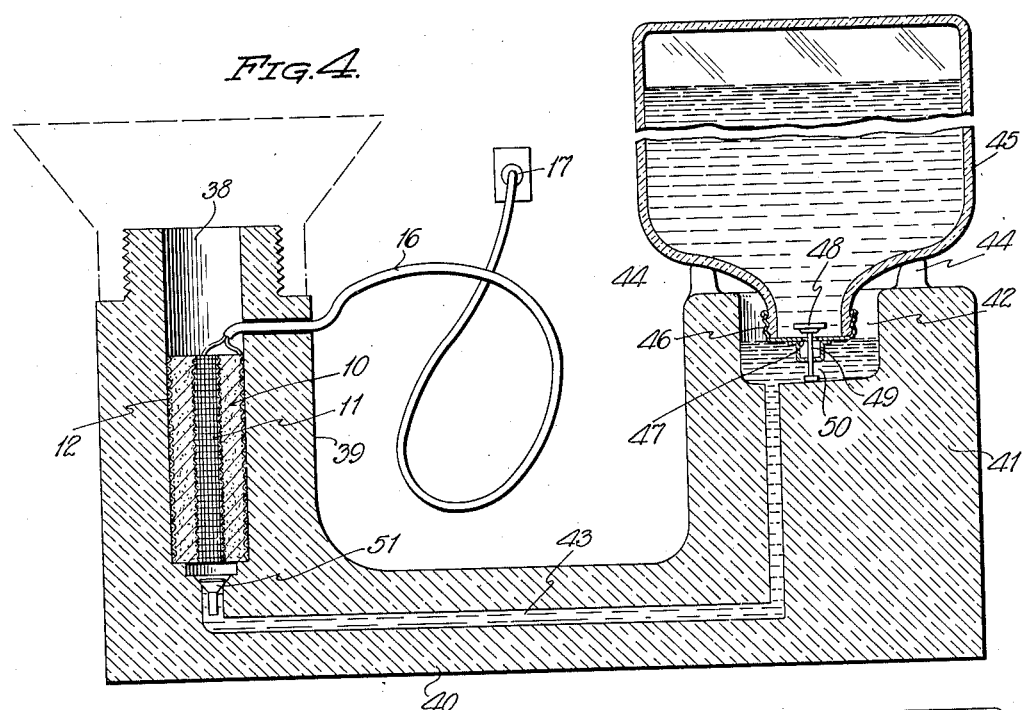
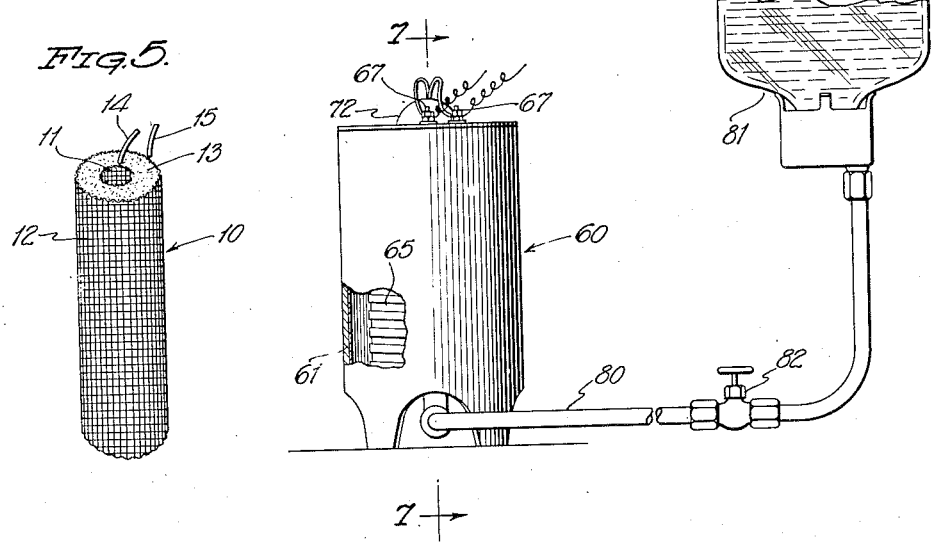
HARRY COWAN.
INVENTOR.
WITNESS:
BY Ely & Pattison.
ATTORNEYS.

Dec. 20, 1938.   H. COWAN   2,140,516
ELECTRICAL STEAM GENERATOR
Filed Oct. 15, 1936    3 Sheets-Sheet 3
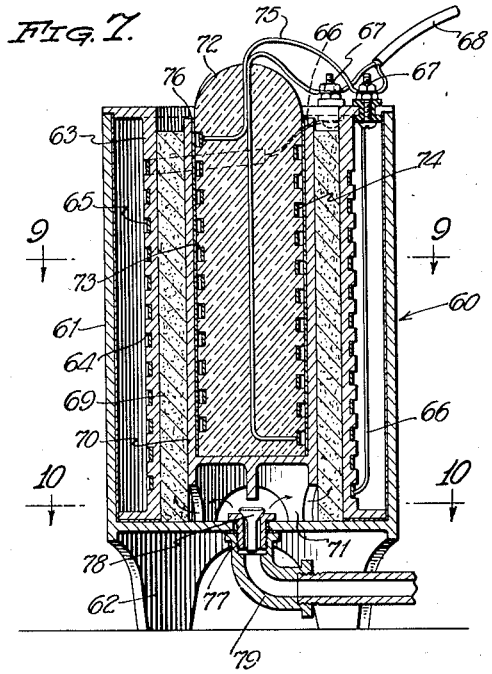
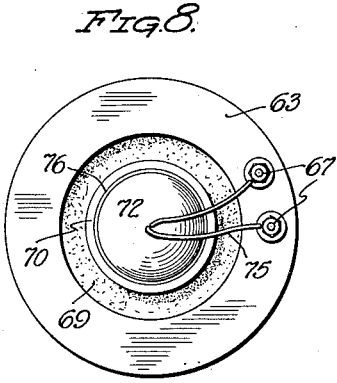
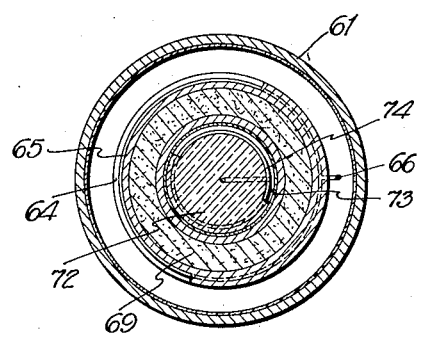
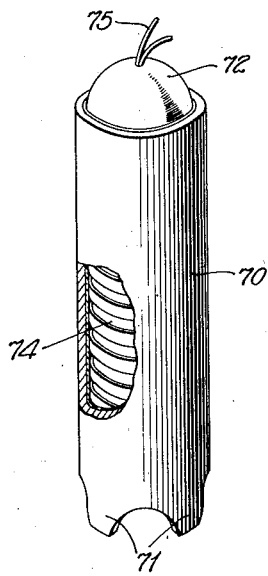
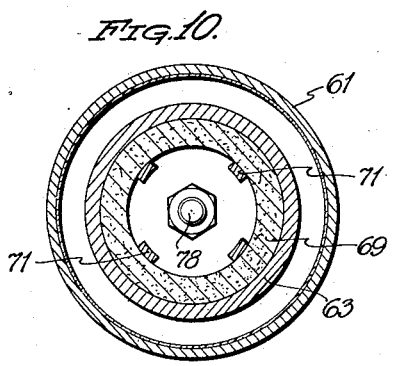
HARRY COWAN.
INVENTOR.
BY Ely & Pattison.
ATTORNEYS.

Patented Dec. 20, 1938

2,140,516

UNITED STATES PATENT OFFICE 2,140,516

ELECTRICAL STEAM GENERATOR

Harry Cowan, Boston, Mass.

Application October 15, 1936, Serial No. 105,763

12 Claims. (Cl. 219—40)

This invention relates to improvements in electrical steam generators.

One of the principal features of the invention resides in an electrical steam generator by which a minimum volume of water is subjected to a maximum amount of heat to produce a continuous supply of steam instantaneously.

From my knowledge of the prior art to which this invention relates, I have discovered that steam generated on the face of electrically heated plates causes a momentary break in the generation of steam until such time as the steam has cleared the plates. This fault is particularly found in steam generators wherein the water acts in the capacity of an electrical conductor and wherein after each break in the generation of steam, water again flows to the surface of the heated plates to make contact and close the electric heating circuit. This intermittent cycle results in a fluctuation in the electric current as well as in the generation of steam, and it is the purpose of this invention to provide an electrical steam generator which will overcome these objections by producing steam instantaneously and in a constant manner.

Another feature of the invention is to provide a vaporizing unit for the generation of steam vapors which consists of a wick interposed between a pair of heating elements whereby the heat of the heating elements is proportionate to the amount of moisture absorbed by the wick to cause an immediate vaporization of the moisture.

A further feature of the invention is the provision of a steam generating unit consisting of a pair of foraminated electrodes between which a water supply wick is interposed, the foraminated electrodes acting to immediately release the steam vapors after their formation, thus reducing the time period of low production of steam while increasing the period of greatest production. In other words, the steam has a more rapid escape to the atmosphere through the porous electrodes and does not form bubbles as occurs in steam generators wherein solid electrodes are employed.

A further feature of the invention resides in an electrical steam generator which may be used in connection with cabinet steam baths, sterilizers, water stills, steam radiators, steam cookers, facial and hair steamers, steam dryers, coffee urns, milk steamers, steam water baths, medicine vaporizers for inhalation and fumigation purposes, and for other uses in hospitals, beauty parlors, and commercial establishments.

With these and other objects in view, the invention resides in the certain novel construction, combination, and arrangement of parts, the essential features of which are hereinafter fully described in the following specification, are particularly pointed out in the appended claims, and are illustrated in the accompanying drawings, in which:

Figure 1 is a perspective view of my invention for use as a vaporizer.

Figure 2 is an enlarged vertical sectional view on the line 2—2 of Figure 1.

Figure 3 is a horizontal sectional view on the line 3—3 of Figure 2.

Figure 4 is a vertical sectional view showing a modified form of the invention.

Figure 5 is a detail perspective view of the steam generating element per se, of the type used in the preceding forms of the invention.

Figure 6 is a side elevational view partly in section of a further modification.

Figure 7 is an enlarged vertical sectional view on the line 7—7 of Figure 6.

Figure 8 is a top plan view of the steam generator unit shown in Figure 7.

Figure 9 is a horizontal sectional view on the line 9—9 of Figure 7.

Figure 10 is a horizontal sectional view on the line 10—10 of Figure 7.

Figure 11 is a detail perspective view of the inner heating element and its shell which forms part of the steam generating unit shown in Figure 7.

Referring to the drawings by reference characters and particularly to the form of my invention illustrated in Figures 1 to 5, inclusive, the numeral 10 designates my steam generating unit in its entirety which is cylindrical in shape and includes inner and outer cylindrical porous low resistance electrodes 11 and 12. The porous electrodes are preferably constructed of copper mesh screen when the unit is to be operated by A. C. current and are of equal length, whereas the diameter of the inner cylindrical electrode 11 is less than that of the outer cylindrical electrode 12 to provide a space therebetween to snugly but not tightly receive a tubular insulating and spacer wick 13. When D. C. current is employed for operating the unit, the foraminated electrodes 11 and 12 may be constructed of a material of less oxidation than copper, such as stainless steel or the like. The wick 13 is preferably constructed of asbestos but may be made of any other absorbent non-combustible material. Connected to the top ends of the porous electrodes 11 and 12 are electric wires 14 and 15 respectively of an electric cord 16, to the free end of which is attached a plug 17. It will thus be seen that normally when the asbestos wick 13 is dry and acts as an insulator to space the electrodes, the circuit between the electrodes 11 and 12 is broken, assuming that the plug 17 is inserted into an electric outlet, but when the wick is saturated with moisture, the moisture acts as a conductor between the electrodes 11 and 12 to complete the circuit to cause heating of the foraminated electrodes.

In Figures 1 to 3, inclusive, I have illustrated the use of the steam generating unit 10 in association with a vaporizer 18 which may be used for the vaporization of water, medicament, fumigants, or the like, and which includes a receptacle 19 open at its top. A cover 20 is threaded to the top of the receptacle for closing the same and is provided with a central opening 21. Freely passing through the opening 21 and extending beyond the top of the cover is the reduced threaded nipple 22 of a porcelain shell 23. The shell is provided with a central well 24 of uniform diameter, which well opens through the top of the shell while the lower end thereof is provided with a restricted liquid inlet passage 25 which opens into an enlarged recess 26. The walls of the recess are provided with a beveled valve seat 27 with which the beveled head 28 of a gravity valve 29 normally engages.

The exterior of the shell 23 adjacent the threaded nipple is provided with a flange 30 against which a gasket 31 fits. The gasket 31 also fits against the underside of the cover to seal the joint between the same and the shell.

Threaded to the upwardly extending nipple 22 and engaging the top of the cover is the internally screw threaded nipple 32 of a cup shaped discharge head 33. The bottom of the cup shaped head is provided with a circular series of discharge orifices 34 which communicate with the well 24 through an enlarged cavity 35.

Before threadedly connecting the head 33 with the shell 23, the steam generator unit 10 is freely inserted into the well 24 through the open top thereof, so that the bottom of the same rests upon the bottom of the well 24 with the lower end of the wick 13 partially exposed to the recess 26 but not entirely covering the same. The electric cord 16 extends loosely through an opening 36 in the side wall of the shell 23 and thence through an opening 37 in the cover 20. The opening 36 serves to equalize pressure of the liquid in the container and the well and also serves to prevent the creation of a vacuum in the container as the liquid is consumed.

In practice, the container 19 is filled with liquid to be vaporized, such as water, medicament, or fumigant, and the plug 17 is inserted into an electric outlet as shown at 37 in Figure 2 of the drawings. The liquid in the container 19 seeps into the recess 26 past the gravity valve 29, from where it enters the well 24 and is absorbed by the wick 13. As the well is filled with liquid to the level of the liquid in the container 19 and the wick becomes saturated, the circuit between the porous electrodes 11 and 12 is closed, thus causing the electrodes to become heated. The heat on the surfaces of the electrodes transforms the moisture thereon into steam or vapor, which steam or vapor rises upwardly and is discharged in jet form through the discharge orifices 34. Should the pressure of the steam or vapor back up or become accumulated within the well 24, it is prevented from escaping through the liquid inlet passage 25 by reason of the valve 29.

From the foregoing description, it will be apparent that a relatively small vaporizer having a self container of water or other liquid supply is provided, wherein the liquid supply provides a greater output of steam or vapor at the start which gradually diminishes as the liquid level becomes lower. When the liquid level drops below the plane of the bottom of the well 24, the well and wick become dry and the circuit in which the electrodes 11 and 12 are arranged becomes broken, thus providing an automatic shut off. This vaporizer is especially adapted for use with A. C. current, for the reason that the current surges sixty times a second from one electrode to the other, causing the generation of continuous steam or vapor without feed back. Furthermore, by employing cylindrical screen electrodes the heat therefrom is sufficient to immediately vaporize the surrounding supply of liquid as it accumulates within the well and upon the wick.

In Figure 4 of the drawings, I have illustrated a modified form of my invention wherein the liquid to be vaporized is fed to the generator unit by automatic gravity flow. In this form the generator unit 10 is identical with that previously described and is seated in a well 38 formed in a standard 39 rising upwardly from a base 40. The base 40 also has a pedestal 41 integral therewith in the top of which is a liquid supply well 42 which communicates with the bottom of the well 38 by a duct 43. The top of the pedestal is formed with a seat 44 upon which a bottle 45 containing water or other liquid is supported in an inverted position with the neck thereof extending into the well 42. The mouth of the bottle is closed by a screw cap 46 having a restricted outlet 47 therein. The outlet is normally closed by a valve 48 from which a valve stem 49 extends. A spring 50 surrounds the stem 49 and tends to maintain the valve 48 in closed position, but when the bottle is supported upon its seat 44 the valve is moved to open position by reason of the outer end of the stem engaging the bottom of the well 42. The level of the liquid in the well 42 is maintained on a plane with the top of the generator unit 10, and the gravity flow from the well 42 to the well 38 is through the duct 43. A check valve 51 is provided in the bottom of the well 38 and serves the same function of preventing feed back of steam from the steam well 38 into the liquid supply. The top of the standard 39 is screw threaded for receiving any desired form of discharge head.

In practice, water or other liquid may be fed to the generator unit 10 in the quantities necessary to maintain the wick 13 in moistened condition. However, should the source of supply become exhausted, the circuit through the porous electrodes 11 and 12 is broken. By employing a bottle to contain the liquid, it is possible to keep watch of the contents and to refill the bottle with liquid should the supply become low.

In Figures 6 to 11 inclusive, I have shown a further modification wherein the wick of the generating unit is isolated from the electric heating elements instead of in contact therewith as heretofore shown and described. In this form, the generating unit is designated in its entirety at 60 and includes a cylindrical open top casing 61, the bottom of which is supported in elevated position by legs 62. Snugly fitting into the casing 61 and closing the open top thereof is a metal spool shaped member 63 having the exterior of its cylindrical body portion provided with a spiral groove 64 in which a ribbon-like heating element 65 is countersunk. Wires 66 lead from opposite ends of the heating element 65 to positive and negative binding posts 67 on the top of the member 63. The positive and negative leads of an electric conductor 68 are also joined to the respective posts 67.

Snugly fitting within the spool shaped member 63 is a cylindrical asbestos wick 69, and fitting within the cylindrical wick is a metal cylindrical member 70 having its bottom supported in an elevated position above the bottom of the casing 61 by legs 71. Snugly fitting within the cylindrical member 70 is a porcelain core 72 having a spiral groove 73 in which a ribbon like heating element 74 is countersunk. Wires 75 connect opposite ends of the heating element 74 to the respective binding posts 67. A cylinder of mica 76 is interposed between the core 72 and the cylindrical member 70, and other metallic parts may be similarly insulated to avoid short circuiting of the heating elements when current is fed thereto.

Threaded in the bottom of the casing 61 centrally thereof is a nipple 77 in which a gravity check valve 78 is mounted. An elbow 79 is threaded to the nipple 77 and connects the nipple with a pipe line 80 leading to a source of liquid supply 81 which may be in the form of an inverted bottle or tank as shown in Figure 6. A hand operated valve 82 is arranged in the pipe line to control the flow of liquid from the source of supply to the generator unit.

In the operation of the generator just described, liquid is fed from the source of supply by gravity and entering the casing 61 through the nipple 77, from where it is absorbed by the wick 69. Either A. C. or D. C. current is supplied to the spiral heating elements 65 and 74 and heats the members 63 and 70 between which the wick is interposed and transforms the moisture in the wick to steam or vapor. The steam or vapor rises through the top of the wick and passes therefrom to the atmosphere. Any steam pressure which may accumulate within the chamber between the casing bottom and the bottom of the member 70 is prevented from feeding back into the liquid supply line by reason of the check valve 78.

While I have shown and described what I consider to be the best embodiments of my invention, I wish it to be understood that other modifications may be resorted to if desired, as come within the scope of the appended claims.

Having thus described the invention, what I claim as new and desire to secure by Letters Patent of the United States, is:—

1. A steam generator comprising a well open at its top, an absorbent heating element freely disposed in said well in close proximity to the side walls thereof, a liquid supply reservoir having communications with said well through the bottom thereof, said well being formed of insulation material and removably supported in an upright position in the reservoir and means preventing feed back of steam through the bottom of said well into the liquid feeding means when the water therein is transformed into steam by said absorbent heating element.

2. A steam generator comprising in combination, a well open at its top and having a water inlet at the bottom thereof, an electric absorbent heating element freely disposed in said well in close proximity to the walls thereof, said heating element including a pair of spaced foraminous electrodes, a loose packing of insulation material interposed between said electrodes and adapted, when subjected to the water in the well, to act as a conductor between the electrodes for heating the water.

3. A steam generator comprising in combination, a receptacle having a removable cover and adapted to contain a supply of liquid to be transformed into steam, a well member having a steam outlet at the top thereof, said well being formed of insulation material and removably suspended in an upright position within said receptacle by said cover, an inlet in the bottom of said well member for admitting liquid thereinto from said receptacle, an electric absorbent heating element contained within said well member, and means at said inlet for preventing feed back of steam generated in said well member from backing up into said receptacle and conduit means leading from the well to the receptacle above the heating element to equalize pressure in the well and receptacle.

4. In a steam generator, an absorbent heating unit comprising a pair of spaced low resistance foraminated electrodes, and a spacing element of loose insulation material interposed between said electrodes and adapted, when saturated, to act as a conductor between said electrodes.

5. In a steam generator, a heating unit comprising a pair of spaced cylindrical perforated low resistance foraminous electrodes arranged in concentric relation, and a non-combustible spacing element of loose material interposed between and in intimate contact with said cylindrical electrodes and adapted, when saturated, to act as a conductor between said electrodes.

6. In a steam generator, a heating unit comprising a pair of spaced concentric low resistance screen electrodes, and a tubular non-combustible spacing element of loose material interposed between and in intimate contact with said screen electrodes and adapted, when saturated, to act as a conductor between said electrodes.

7. A steam generator comprising in combination, a well of insulation material having an inlet in its bottom and a steam discharge outlet at its top, an absorbent heating element freely fitting in said well, and means responsive to steam pressure in the well for automatically supplying a liquid to said well through said inlet, said liquid being utilized as a conductor to energize said heating element.

8. In a steam generator, an electric steam generating unit comprising a pair of cylindrical screen electrodes of different diameters and of substantially equal lengths, the smaller diameter electrode being disposed in spaced concentric relation to the electrode of larger diameter, and a non-combustible spacing element of loose material interposed between said cylindrical screen electrodes and adapted, when saturated, to act as a conductor between said electrodes.

9. A steam generator comprising a receptacle adapted to contain a liquid to be transformed into steam vapor having an open top, a cover closing the open top of said receptacle and having a central opening therein, a well member of insulation material open at its top and having a water inlet in its bottom, a reduced threaded neck at the top end of said well member extending through the opening in said cover, a steam jet member threaded to the neck of said well member and supporting said well member in a suspended position in the receptacle, and an electric heater element contained within said well member.

10. A steam generator comprising a receptacle adapted to contain a liquid to be transformed into steam vapor having an open top, a cover closing the open top of said receptacle and having a central opening therein, a well member open at its top and having a water inlet in its bottom, a reduced threaded neck at the top end of said well member extending through the opening in said cover, a steam jet member threaded to the neck of said well member, an electric heater element contained within said well member and utilizing the liquid therein as a conductor, and automatic valve means in said water inlet and responsive to steam pressure in the well for controlling the flow of liquid from said receptacle to said well member and for preventing the feed back of steam generated in said well member from backing up in said receptacle.

11. In a steam generator, an electrical heating unit comprising spaced concentric wire mesh screen electrodes of relatively low electrical resistance, and a porous spacer element of non-conducting material interposed between said electrodes and adapted, when saturated, to act as a conductor between said electrodes.

12. In a steam generator having a cylindrical well of insulation material adapted to contain liquid to be transformed into steam vapor by the direct application of heat thereto, a tubular cylindrical electrical heating unit of an external diameter slightly less than the internal diameter of said cylindrical well, said electrical heating unit comprising an outer wire mesh cylindrical electrode, an inner wire mesh cylindrical electrode concentrically spaced with respect to said outer cylindrical electrode, said wire mesh electrodes being of relatively low electrical resistance, and a cylindrical porous insulating element interposed between said inner and outer cylindrical wire mesh electrodes and adapted, when saturated, to act as a conductor between said electrodes to heat the liquid in the well.

HARRY COWAN.